United States Patent
Darrell et al.

(10) Patent No.: US 7,872,669 B2
(45) Date of Patent: Jan. 18, 2011

(54) PHOTO-BASED MOBILE DEIXIS SYSTEM AND RELATED TECHNIQUES

(75) Inventors: Trevor J. Darrell, Dover, MA (US); Tom Yeh, Cambridge, MA (US); Konrad Tollmar, Nykoping (SE)

(73) Assignee: Massachusetts Institute of Technology, Cambridge, MA (US)

( * ) Notice: Subject to any disclaimer, the term of this patent is extended or adjusted under 35 U.S.C. 154(b) by 755 days.

(21) Appl. No.: 10/762,941

(22) Filed: Jan. 22, 2004

(65) Prior Publication Data

US 2005/0162523 A1 Jul. 28, 2005

(51) Int. Cl.
*H04N 5/225* (2006.01)
(52) U.S. Cl. .................................. 348/207.1
(58) Field of Classification Search ............. 348/207.1; 382/305, 190, 165; 455/456.1, 457
See application file for complete search history.

(56) References Cited

U.S. PATENT DOCUMENTS

| | | | | |
|---|---|---|---|---|
| 5,852,823 | A * | 12/1998 | De Bonet | 707/6 |
| 6,463,426 | B1 * | 10/2002 | Lipson et al. | 707/3 |
| 6,504,571 | B1 * | 1/2003 | Narayanaswami et al. | 348/231.99 |
| 6,522,889 | B1 | 2/2003 | Aarnio | |
| 6,786,405 | B2 * | 9/2004 | Wiedenhoefer | 235/385 |
| 7,016,532 | B2 * | 3/2006 | Boncyk et al. | 382/165 |
| 7,043,474 | B2 * | 5/2006 | Mojsilovic et al. | 707/6 |
| 7,099,860 | B1 * | 8/2006 | Liu et al. | 707/3 |
| 2002/0102966 | A1 * | 8/2002 | Lev et al. | 455/412 |
| 2005/0113113 | A1 * | 5/2005 | Reed | 455/456.3 |

OTHER PUBLICATIONS

Makiko Noda, Cosmos; Convenient Image Retrieval System of Flowers for Mobile Computing Situations, Sep. 25, 2002, pp. 25-30, Anaheim, California.
Yuh-Shyan Chen, A Mobile Butterfly-Watching Learning System for Supporting Independent Learning. Mar. 23, 2004. pp. 11-18. Los Alamitos, USA.
PCT/US2004/015624 International Search Report.

* cited by examiner

*Primary Examiner*—Justin P Misleh
(74) *Attorney, Agent, or Firm*—Daly, Crowley, Mofford & Durkee, LLP

(57) ABSTRACT

A mobile deixis device includes a camera to capture an image and a wireless handheld device, coupled to the camera and to a wireless network, to communicate the image with existing databases to find similar images. The mobile deixis device further includes a processor, coupled to the device, to process found database records related to similar images and a display to view found database records that include web pages including images. With such an arrangement, users can specify a location of interest by simply pointing a camera-equipped cellular phone at the object of interest and by searching an image database or relevant web resources, users can quickly identify good matches from several close ones to find an object of interest.

20 Claims, 12 Drawing Sheets

PHOTO-BASED MOBILE DEIXIS SYSTEM AND RELATED TECHNIQUES

FIELD OF THE INVENTION

This invention relates generally to location and object awareness systems and more particularly to systems and techniques to identify a location or object in a person's field of view.

BACKGROUND OF THE INVENTION

When traveling to an unknown location, it is not unusual to be in an environment where one does not know his or her location. In recent years with the availability of global positioning systems (GPS), small hand held GPS receivers have appeared in the consumer market to help find one's location while visiting a strange location. Unfortunately, unless one is skilled in using a geographical map, a GPS receiver is not always user friendly especially in crowded downtown environments. Furthermore, one may know his or her general location, but may be interested in a specific object in his or her field of view.

A deictic (pointing) gesture together with an inquiring utterance of the form "What's that?" are common conversational acts utilized by a person when visiting a new place with an accompanying host. But alone, one must resort to maps, guidebooks, signs, or intuition to infer the answer. It would be desirable to have a user friendly device to help one know his or her location and further help one learn about an object in his or her field of view.

It has been observed that maps and tour books often lack detailed information and most people do not use them in everyday life, although most people carry a map when traveling to a new location. One interesting observation is the tendency of people to overstate the usefulness of a street map realizing they actually wanted to know more than what a map could provide, such as specific details about buildings and artifacts they were seeing around them. Typically, there are many specific questions asked by individuals, including requesting historic information and events, names of buildings, and makers of public artworks. It has been observed that two commonly asked questions are "where can I find xxx" and "what is this." Often times, these questions are followed by requests for time-related information such as business hours and bus schedules. It should be appreciated, the information is needed "right here" and "right now", or it is not worth the effort. Even when a mobile phone was available, it was unlikely to be used to call someone to ask for information. An exception to the latter was having an appointment to meet someone and needing to get the directions to the meeting location. It should be appreciated that location-based information services which provided access to a generic information service such as the world wide web, and which was initiated by a real-time query (e.g., "What is this place") followed by a browsing step, would complement the users' experience in an unfamiliar setting and meet their needs for a location-based information service.

Web resources exhibit a high correlation between semantic relevancy and spatial proximity, an observation that has been noted and widely exploited by existing search technologies. Pieces of knowledge close together in cyberspace tend to be also mutually relevant in meaning. An intuitive reason is that web developers tend to include both text and images in authoring pages meant to introduce certain information. In practice, current web-image search engines, such as Google, use keywords to find relevant images by analyzing neighboring textual information such as caption, URL and title. Most commercially successful image search engines are text-based. The web site "www.corbis.com" (Corbis) features a private database of millions of high-quality photographs or artworks that are manually tagged with keywords and organized into categories. The web site "www.google.com" (Google) has indexed more than 425 million web pages and inferred their content in the form of keywords by analyzing the text on the page adjacent to the image, the image caption, and other text features. In both cases, the image search engine searches for images based on text keywords. Since the visual content of the image is ignored, images that are visually unrelated can be returned in the search result. However, this approach has the advantage of text search, semantically intuitive, fast, and comprehensive. Keyword-based search engines (e.g. Google) have established themselves as the standard tool for this purpose when working in known environments. However, formulating the right set of keywords can be frustrating in certain situations. For instance, when the user visits a never-been-before place or is presented with a never-seen-before object, the obvious keyword, name, is unknown and cannot be used as the query. One has to rely on physical description, which can translate into a long string of words and yet be imprecise. The amount of linguistic effort for such verbal-based deixis can be to involving and tedious to be practical. It should be appreciated that an image-based deixis is desirable in this situation. The intent to inquire upon something is often inspired by one's very encounter of it and the very place in question is conveniently situated right there.

SUMMARY OF THE INVENTION

In accordance with the present invention, a mobile deixis device includes a camera to capture an image and a wireless handheld device, coupled to the camera and to a wireless network, to communicate the image with existing databases to find similar images. The mobile deixis device further includes a processor, coupled to the device, to process found database records related to similar images. The mobile deixis device further includes a display to view found database records that include web pages including images. With such an arrangement, users can specify a location of interest by simply pointing a camera-equipped cellular phone at the location of interest and by searching an image database or relevant web resources, users can quickly identify good matches from several close ones to find the location of interest.

In accordance with a further aspect of the present invention, the mobile deixis device can communicate with a server database which includes a web site dispersed within the Internet and having keywords linked to each similar image and the server database is capable of initiating a further search using the keywords to find additional similar images. With such an arrangement, images can be used to find keywords that can then be used to find additional images similar to the unknown image to improve the available information to a user.

In accordance with a still further aspect of the present invention, the computer with the server database in communication with the mobile deixis device is capable of comparing the original image with images resulting from the further search using the keywords to find additional similar images to eliminate irrelevant images. With such an arrangement, irrelevant text based images can be removed to improve the available information to a user.

In accordance with a still further aspect of the present invention, the mobile deixis device further includes a global positioning system (GPS) receiver to identify the geographical location of the mobile deixis device which can be used to eliminate any similar images that are known not to be located in the geographical location of the mobile deixis device. With such an arrangement, similar images found but not located in the general geographical area of the mobile deixis device can be eliminated to reduce the time needed by a user to identify the his or her location or objects in his or her field of view.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Before providing a detailed description of the invention, it may be helpful to review the state of the art of recognizing location using mobile imagery. The notion of recognizing location from mobile imagery has a long history in the robotics community, where navigation based on pre-established visual landmarks is a known technique. The latter includes techniques for simultaneously localizing robot position and mapping the environment. Similar tasks have been accomplished in the wearable computing community wherein a user walks through a location while carrying a body-mounted camera to determine the environment. For example, a wearable-museum guiding system utilizes a head-mounted camera to record and analyze a visitor's visual environment. In such a system computer vision techniques based on oriented edge histograms are used to recognize objects in the field of view. Based on the objects seen, the system then estimated the location in the museum and displayed relevant information. The focus of this system was on remembering prior knowledge of locations, i.e. which item is exhibited where, rather than finding information about new locations. In these robotics and wearable computing systems, recognition was only possible in places where images had been specifically collected for later recognition. These systems could not recognize places based on image information provided on a computer network, which was not specifically collected for recognizing that location.

It should be appreciated that location-based information services which provided access to a generic information service such as the world wide web, and which was initiated by a real-time query (e.g., "What is this place") followed by a browsing step, would complement the users' experience in an unfamiliar setting and meet their needs for a location-based information service. The present invention provides a system to allow users to browse a generic information service (the world wide web) using a novel point-by-photography paradigm (taking an image of the selected location) for location-specific information. Such is possible by using a new pointing interface and location-based computing technique which combines the ubiquity of a new generation of camera-phones and content based image retrieval (CBIR) techniques applied to mobile imagery and the world wide web.

Figure 1:
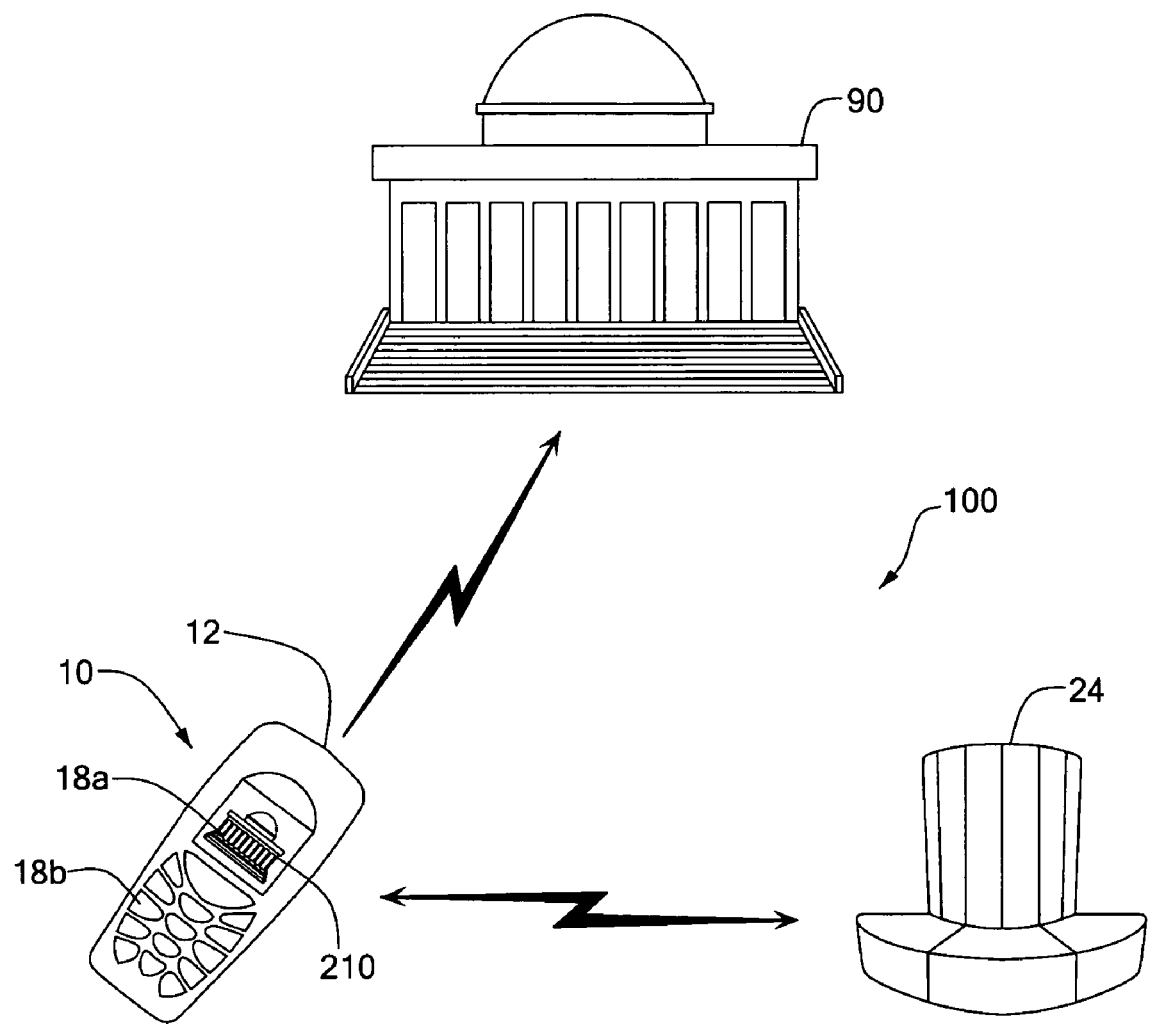
FIG. 1 is a system diagram of a location awareness system according to the invention.
Figure 1A:
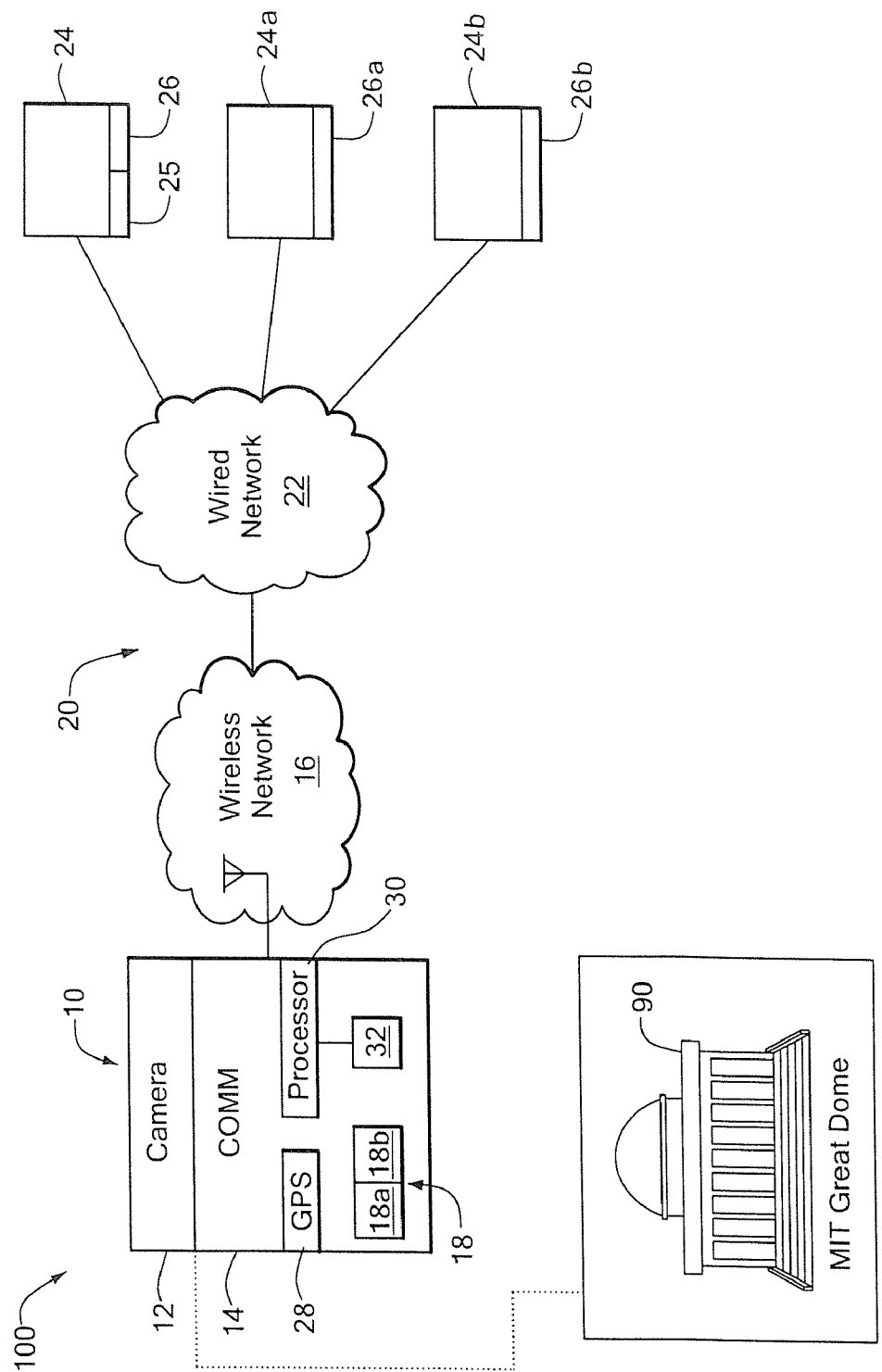
FIG. 1A is a block diagram of a location awareness system according to the invention.

Referring now to FIGS. 1 and 1A, a location awareness system 100 includes a handheld device 10 (sometimes also referred to as mobile deixis device 10) having a camera 12 to capture an image 210 of an object 90. The handheld device 10 further includes a wireless communication device 14 coupled to the camera and to a wireless network 16 to communicate the image 210 with a computer 24 having a database 25 with computer files 26 to find similar images and a user interface 18, having here a display 18a and a keyboard 18b, coupled to the wireless communication device 14, to communicate to an user any results of found similar images. It should be appreciated alternatively the user interface 18 could include a small hand held computer or a data connection to connect a hand held computer to the wireless communication device 14 to facilitate user interaction. The location awareness system 100 further includes a computer network 20 including the wireless network 16 and a wired network 22 and a plurality of computers including computers 24, 24a, 24b, each computer 24, 24a, 24b having a plurality of computer files 26, 26a, 26b, respectively and connected to the computer network 20. At least one of the computer files 26 includes an image similar to the captured image and when viewed includes associated text describing an object in the image.

In a preferred embodiment, in computer 24, a web database 25 is created having images of known objects wherein the associated text which describes features of the object in the image typically includes geographical location information of the object as well as a description and any historical facts regarding the object. It is also typical for the associated text to include a uniform resource locator (URL) showing where the text is located. It is also typical to include images of objects of interest located within a predetermined radius about the geographical location of the object in the image. In one embodiment, the computer 24 with the web database 25 having a plurality of computer files 26 to include images of objects of interest located within a predetermined radius about a geographical location was previously trained to find common objects known to be of interest. The web database 25 may further include an image of an object of known interest and an associated image of an object of less recognized interest within a predetermined radius about a geographical location of the known interest object to aid a user in finding the object of less recognized interest. It is still further typical for the web database 25 to include an object of known interest and an associated image of an object of less recognized interest within the field of view of the known interest object to aid a user in finding the object of less recognized interest. In an alternative embodiment, the device 10 includes a global positioning system (GPS) receiver 28 to identify the geographical location of the mobile communication device to help eliminate non-useful images.

In operation, system users specify a particular location by pointing to an object with camera 12 and taking an image. The location can be very close, or it can be in a distant, but it must be visible. In contrast, GPS, cell-tower location, or tagging-based architectures are effective at identifying the location of the device but cannot easily provide a direction and distance from that device, e.g., to specify a coordinate of a building across a river. The present system allows users to stay where they are and point at a remote place in sight simply by taking photographs. It should be appreciated such a system does not require any dedicated hardware infrastructure, such as visual or radio-frequency barcode tags, infrared beacons, or other transponders. No separate networking infrastructure is necessary and existing wireless service carriers, for example, General Packet Radio Service (GPRS) and Multimedia Messaging Service (MMS) can be used. Having specified a location, a location awareness system 100 then searches for geographically relevant messages or database records.

Using the hand held device 10 with a camera 12, an image-based query can be formed simply by pointing with the camera 12 and snapping a photo. In our technique, an image is used to find matching images of the same location. In many situations, finding these images on the web can lead us to the discovery of useful information for a particular place in textual form. The built-in camera 12 enables the user to produce query images on the spot and wireless capability permits communication with a remote image database 25 (sometimes also referred to as web database 25). It has been observed that there is no need to look for a perfect match. Moderately good results arranged as a thumbnail mosaic as described further herein allows any user to swiftly identify just what images are relevant.

Figure 2:
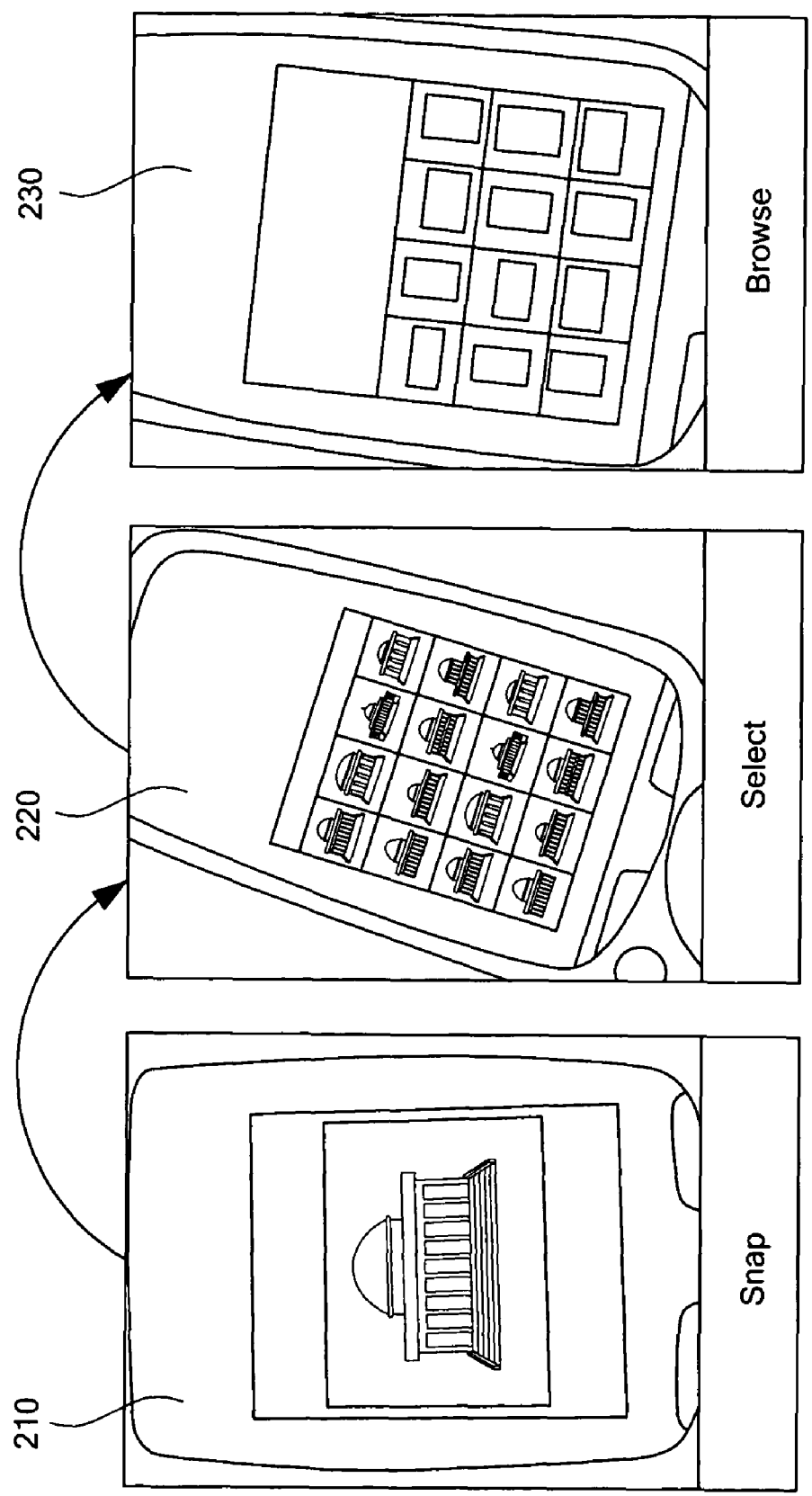
FIG. 2 shows exemplary screen displays according to the invention.

In operation, a mobile user can point the camera 12 to the view of interest, take photos, and send them wireless as queries (via multimedia SMS, a.k.a. MMS) to the web database 25. In one embodiment, an image-based (as opposed to keyword-based) URL index is constructed to allow searching. A webcrawler crawls through the web, looks for images, and records the URLs (Uniform Resource Locator) containing these images. Appropriate features are extracted from each image and stored in the database 25. After the indexing is complete, the system can come online. A mobile user can take photos of a place of interest. The photos are sent to the image database 25 via a wireless link. A search engine looks for a set of images most similar to the query image. The result will consist of a list of (candidate image, source URL) pairs. The mobile device 10 displays the result by arranging candidate images into a thumbnail mosaic 220 (FIG. 2). The user, as the final judge, can easily identify what sub-images are "really relevant". When a thumbnail is selected, the source URL is retrieved and the content from that URL is shown on the mobile device 10.

As described above, the handheld device 10 includes the camera 12 to capture an image and a wireless communication device 14, coupled to the camera and to a wireless network 16, to communicate the image with existing database 25 to find similar images. The handheld device 10 also includes a processor 30 and a display 18a to view found database records with the found database records including web pages with images. The handheld device 10 includes a storage medium 32, coupled to the processor 30, with a plurality of programs stored in the storage medium operative to interact with the processor and the mobile communication device to control the operation of the mobile deixis device 10. The plurality of programs includes a first program stored on the storage medium 32 being operative to interact with the processor 30 to capture the image from the camera 12, a second program stored on the storage medium 32 being operative to interact with the processor 30 to communicate with at least one database, here image database 25, to find a similar image similar to the captured image, and a third program stored on the storage medium 32 being operative to interact with the processor 30 to provide to a display 220 (FIG. 2) of a plurality of similar images and maintaining an associated hyperlink for each similar image. The second program stored on the storage medium further includes a subprogram stored on the storage medium 32 being operative to interact with the processor to communicate with at least one server database, as shown here web database 25, to cause the server database to search further databases for other images similar to the captured image.

It should be appreciated storage medium may be used to store programs to control the handheld device 10 or server or computer 24. Hence, storage medium may also include computer readable code stored on the storage medium to interact with a computer 24 having a database 25 with computer files 26 as to be described further hereinafter. Storage medium may be any material constructed to hold digital data in conjunction with storage devices to include but not limited to optical disks, magnetic disks, magnetic tape, compact disks, magneto-optical e.g. MO disks, flash drives and the like.

A typical scenario to illustrate the practice of the invention follows. A user is visiting campus for the first time ever. She is supposed to meet a friend at a location known as "Killian Court". She is uncertain if the building in front of her is the "Killian Court". She takes an image of the building and sends it to the server 24. This image is then used to search the web for pages that also contain images of this building. The server 24 returns the most relevant web pages. By browsing these pages, she finds the name "Killian Court" and concludes that this is the right place." In one embodiment, the system 100 includes a client application running on the mobile device 10, responsible for acquiring query images and displaying search results, and a server 24 having a search engine, equipped with a content-based image retrieval (CBIR) module to match images from the mobile device to pages in the database 25.

Figure 5A:
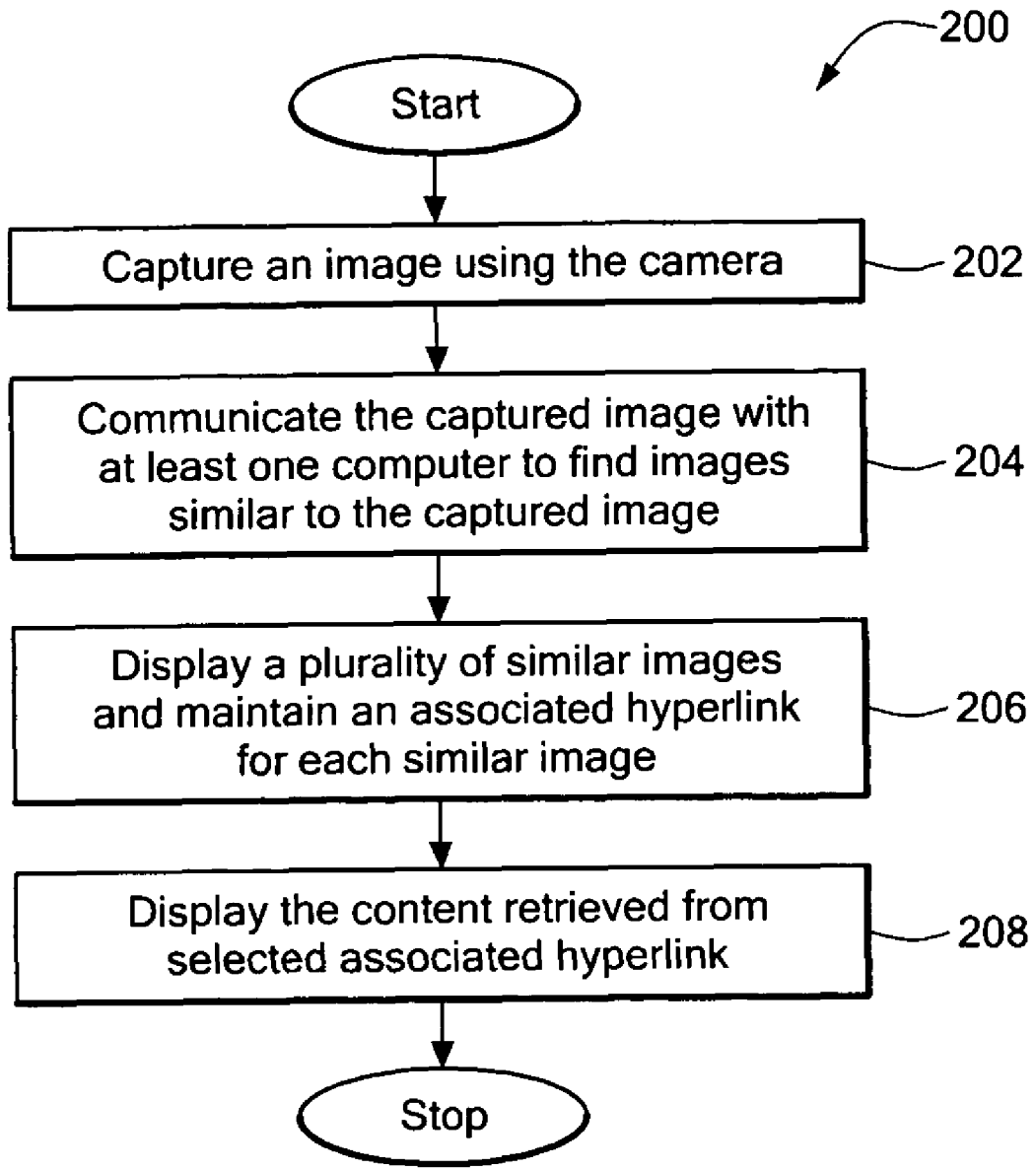
FIGS. 5A, 5B and 5C are other exemplary process steps used in the searching process according to the invention.

Referring now also to FIGS. 2 and 5A, an example of the resulting windows displayed and a flow diagram 200 showing the steps the processor 30 (FIG. 1A) would perform are shown. As shown in process step 202, a user causes the handheld device 10 to capture an image to send as a query as shown in window 210. As shown in process step 204, connected the network 20, the handheld device 10 communicates the captured image to a web server 24 to find images similar to the captured image. It should be appreciated the web server 24 could be any web server connected to the network 20 or preferably web server 24 includes a pre-programmed database including images of interest and corresponding data. As shown in process step 206, the result from a search is displayed as a thumbnail mosaic as shown in window 220 with each image having an associated hyperlink where that image can also be found. As shown in process step 208, selecting a thumbnail image brings up a source webpage for browsing as shown in window 230. In one embodiment, a Nokia 3650 phone taking advantage of its built-in camera (640×480 resolution) and the support for Multimedia Messaging Service (MMS) was used, and using C++ on Symbian OS to implement the required programming steps. To initiate a query, the user points the camera at the target location and takes an image of that location, which is sent to a server via MMS. The system was designed with an interactive browsing framework, to match users' expectations based on existing web search systems. For each query image as shown in window 210, the search result will include the 16 most relevant candidate images for the location indicated by the query image as shown in window 220. Selecting a candidate image brings up the associated web page as shown in window 230 and the user can browse this page to see if there is any useful information.

In one embodiment, information was restricted to a known domain, a single university campus, both for web searching and when initiating mobile queries. An image database including 12,000 web images was collected from the mit.edu domain by a web crawler. Query images were obtained by asking student volunteers to take a total of 50 images from each of three selected locations: Great Dome, Green Building and Simmons Hall. Images were collected on different days and with somewhat different weather conditions, i.e. sunny or cloudy. Users were not instructed to use any particular viewpoint when capturing the images. The image matching performance of two simple CBIR algorithms: windowed color histogram and windowed Fourier transform were used. Principal component analysis was used for finding the closest image in terms of Euclidean distance in the feature space. These are among the simplest CBIR methods, and a further alternative embodiment included the use of image matching based on local invariant features based on the "SIFT" descriptor as described by D. Lowe in an article entitled "Object recognition from local scale-invariant features" published in *Proc. ICCV*, pages 1150-1157, 1999 and incorporated herein by reference that provides even greater performance.

In an alternative embodiment described in more detail hereafter, to improve the results of a search, the steps as describe above are accomplished, with a user taking a picture of a location, and the image search returning a set of matching images and associated web pages. From the returning set of matching images, salient keywords are automatically extracted from the image-matched web pages. These keywords are then submitted to a traditional keyword-based web search such as Google. With this approach, relevant web pages can be found even when such a page contains no image of the location itself.

Figure 3:
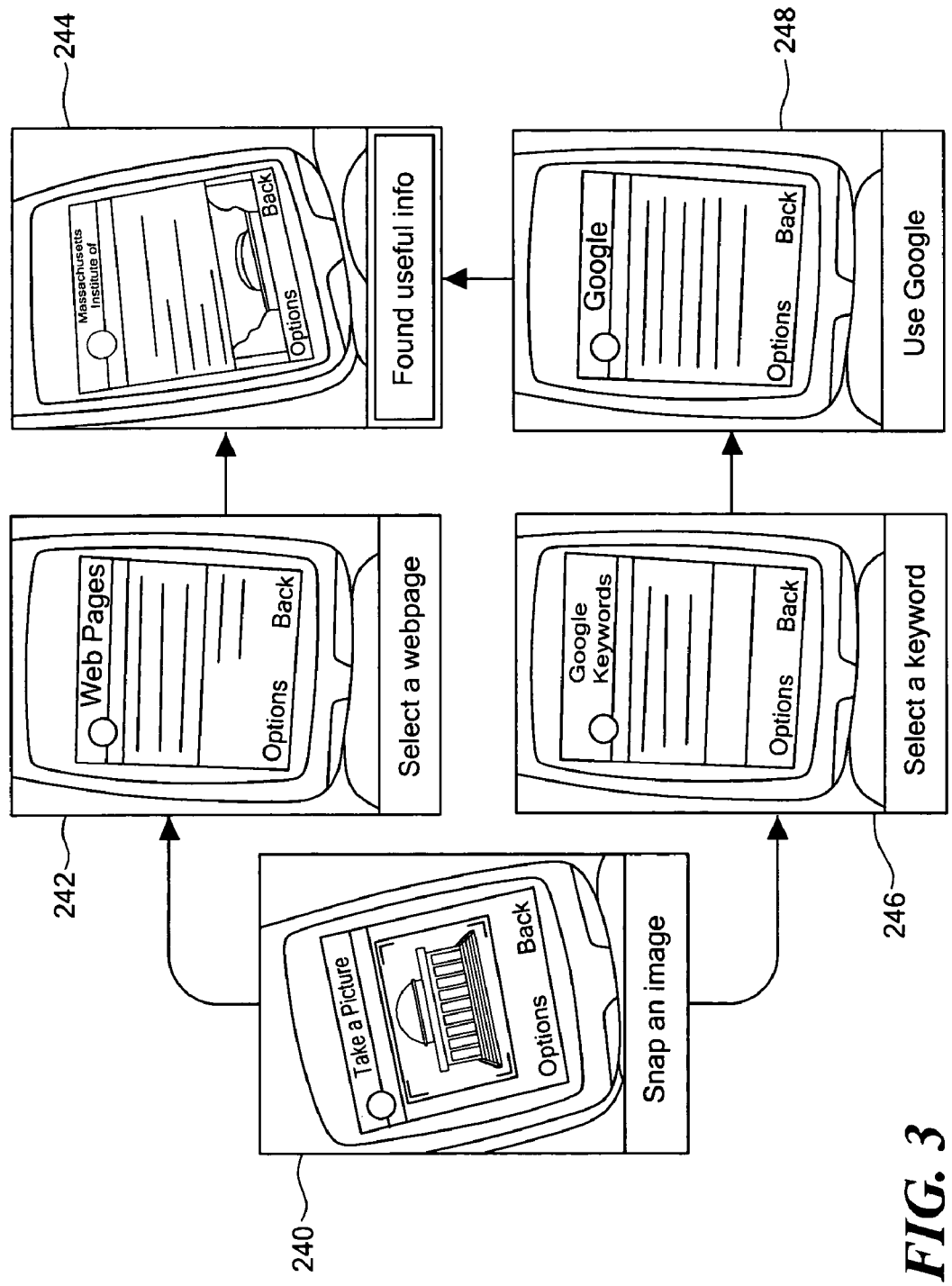
FIG. 3 shows further exemplary screen displays according to the invention.
Figure 5B:
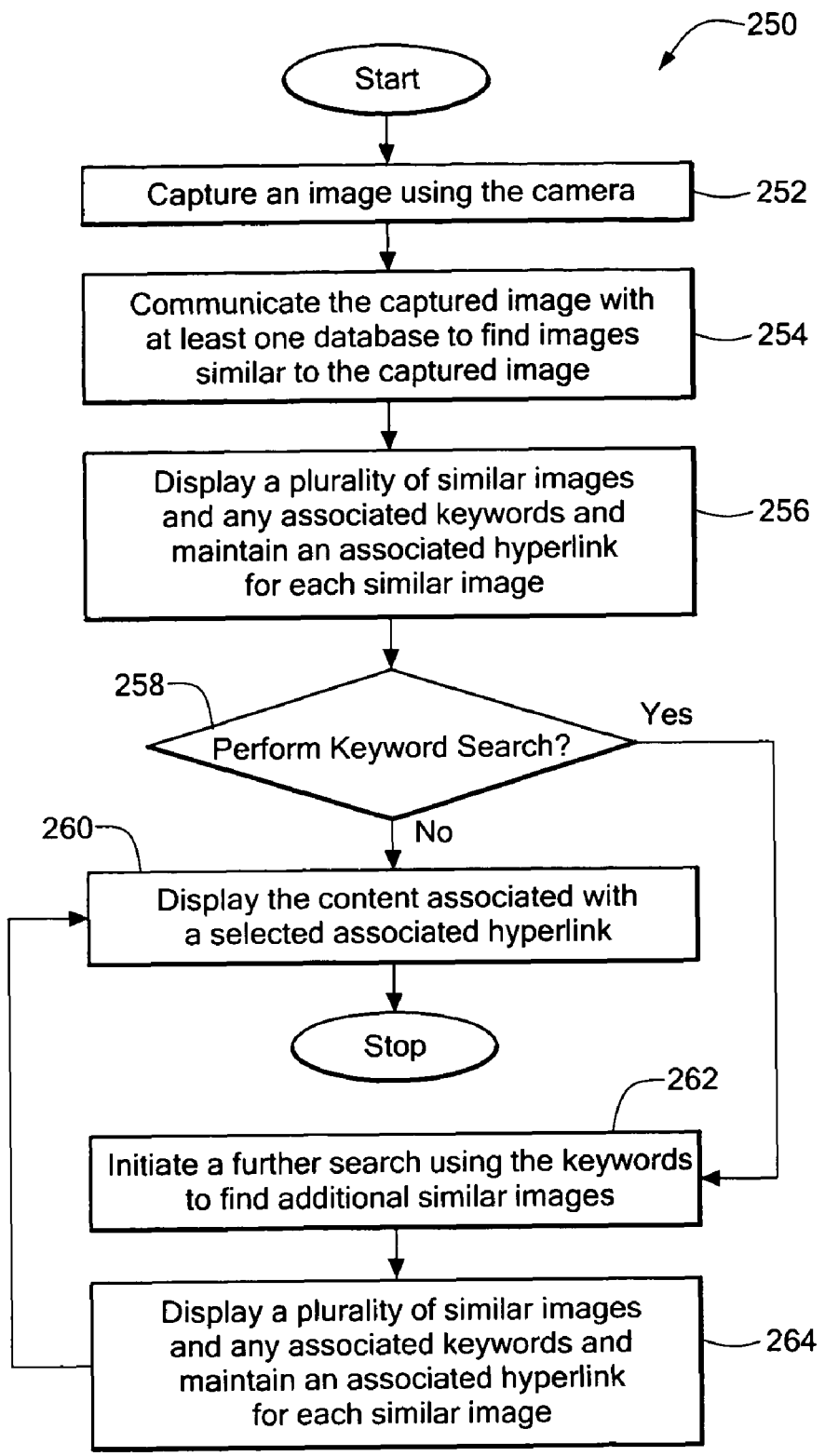

Referring now to FIGS. 3 and 5B, a web interface developed in XHTML Mobile Profile with JavaScript extension was used with the same hardware with an example of the resulting windows displayed and a flow diagram 250 showing the steps the processor 30 (FIG. 1A) would perform are shown. As shown in process step 252, a user causes the handheld device 10 to capture an image to send as a query as shown in window 240. As shown in process step 254, connected the network 20, the handheld device 10 communicates the captured image to a web server 24 to find images similar to the captured image. It should again be appreciated the web server 24 could be any web server connected to the network 20 and preferably web server 24 includes a pre-programmed database including images of interest and corresponding data. As shown in process step 256, the search result is displayed with associated hyperlinks and includes a list of matched web pages containing similar images of the query image. Each page is displayed as a thumbnail accompanied by a text abstract of its content as shown in window 242. If no further searching is necessary, selecting a thumbnail as shown in process step 260 brings up the full content of the page on the screen as shown in window 244. As shown in window 246, automatically extracted keywords are displayed side-by-side with the thumbnail image. If further searching is required, as shown by decision block 258, the process continues with process step 262 where selecting a keyword initiates a keyword-based search on Google to find more information. As shown in process block 264, the results of the keyword search is displayed as shown in window 248. A user can then select one of the results from the keyword search to find a relevant web page and as shown in process block 260 the full content of page is retrieved as shown in window 244.

In an alternative embodiment as shown in FIG. 1A, with a GPS receiver 28 optionally installed in the mobile deixis device 10, a GPS-coordinate-based query to retrieve from a web site such as www.mapquest.com, a map covering the surrounding area can be obtained and used to further refine the results of the image based search. Furthermore, even with an image-based search of location-based information, additional context will be needed for some specific searches. Keyboard entry of additional keywords can also be accomplished or alternatively, users can configure various search preferences. Alternatively, an interface combination wherein keywords are inputted using a speech recognition input at the same time an image-based deixis was being performed, e.g. "Show me a directory of this building!" can be implemented.

Figure 4:
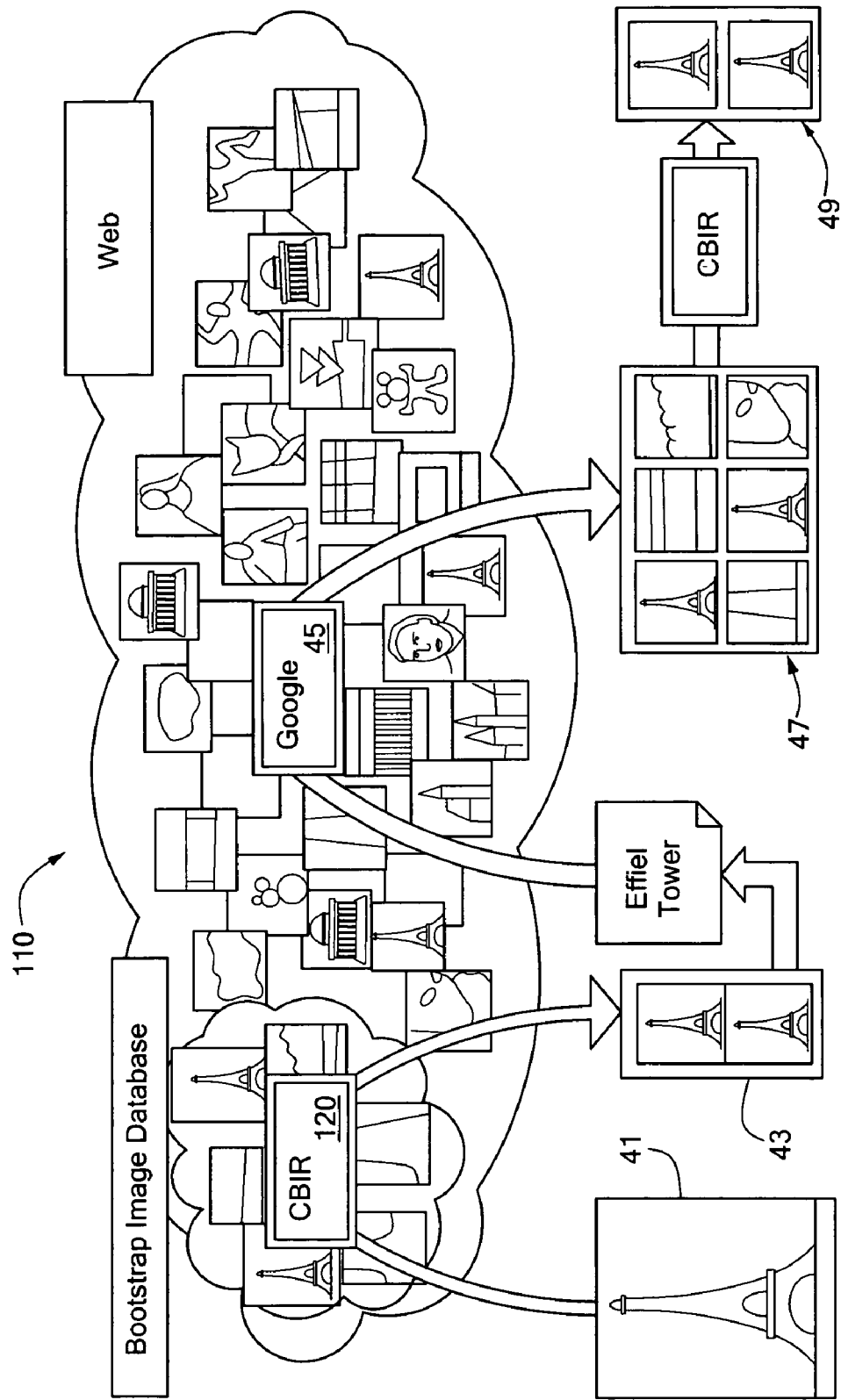
FIG. 4 is a pictorial diagram of the location awareness system according to the invention.
Figure 4A:
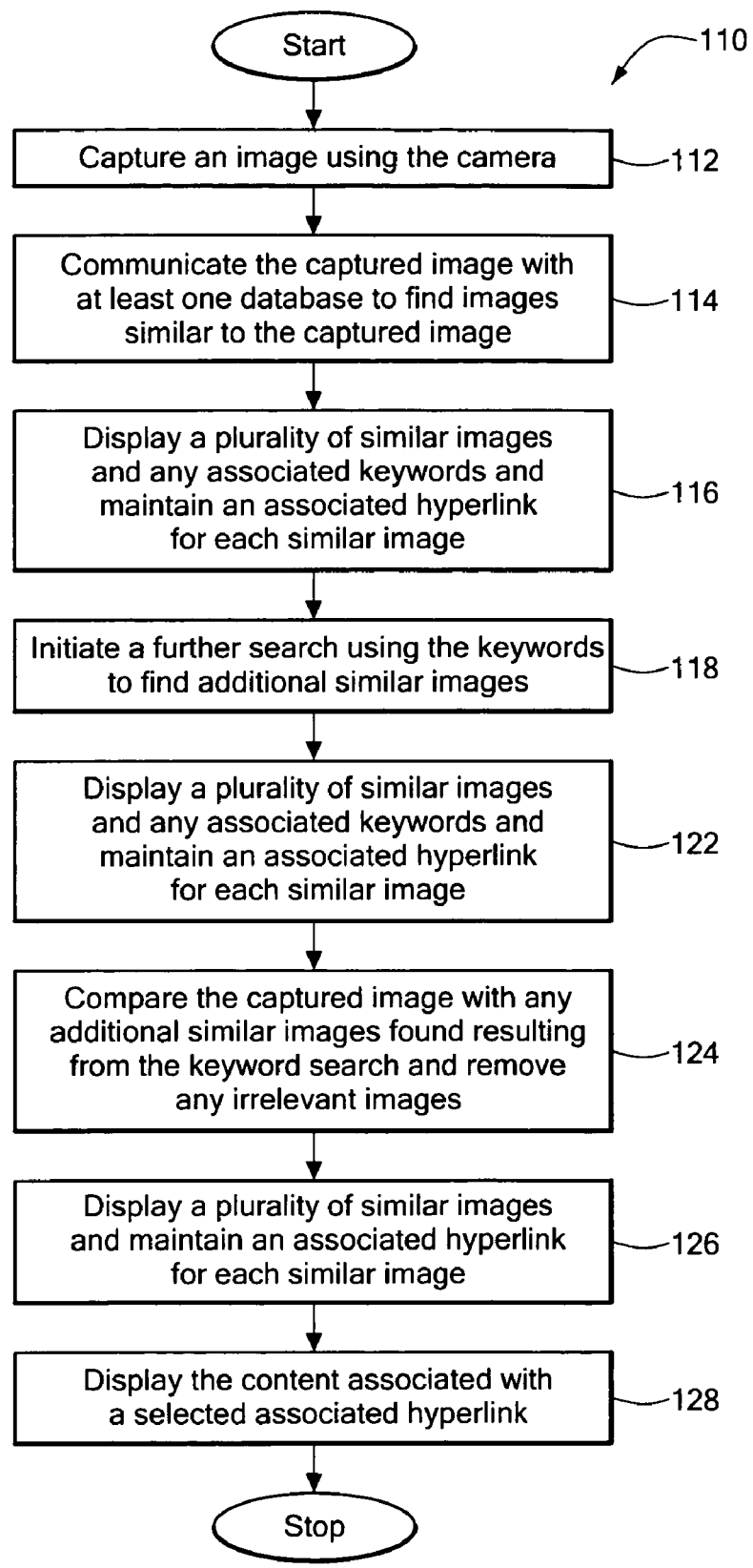
FIG. 4A are exemplary process steps used in the searching process according to the invention.

Referring now to FIGS. 1A, 4 and 4A, an example of the resulting windows displayed and a flow diagram 110 showing the steps the processor 30 and the web server 120 for a more robust system would perform are shown. As shown in process step 112, a user causes the handheld device 10 (mobile deixis device 10) to capture an image as shown in window 41 to send as a query. As shown in process step 114, connected the network 20, the handheld device 10 communicates the captured image to a web server 120 which could be web server 24 to find images similar to the captured image. It should be appreciated that web server 24 in this implementation includes a pre-programmed database including images of interest and corresponding data. The captured image is used as a query to find similar images from a small image database 25 using content-based image retrievial (CBIR) techniques. The results from the query can be optionally provided to the user, as shown in process step 116, and the result from a query is provided with each image 43 having an associated keywords that helps describe the image. As shown in process step 118, keywords are automatically extracted from the earlier provided results and extracted keywords are sent to Google 45 (or any other programmed preferred search engine) to find textually related images. As shown in process step 122, the textually related images 47 are then optionally provided to the user. As shown in process step 124, CBIR techniques are applied once again to textually related images to filter out visually irrelevant images and the resulting remaining images 49 are provided to the user as shown in process step 126. As shown in process step 128, a user can then select one of the results from the second CBIR process to look at a relevant web page and the full content of the page is retrieved.

It should now be appreciated, to recover relevant pages across the full web, a keyword-based search is exploited followed by a content-based filtering step to filter out irrelevant images. Keywords are extracted from web pages with matching images in the bootstrap set. Instead of running CBIR over hundreds of millions of images, only a seed set of images need to be image queried and the images returned from keyword-based search need to be imaged queried. Having described various embodiments of the present invention, a preferred embodiment includes a database 25 created of sets of images obtained by web-crawling a particular area of interest based on the expected application, for example tourism-related sites for a particular geographic location and populating the database 25 with the resulting set of images. The database 25 includes various sets of images that may be of interest to users. As stated hereinabove, searching for images from images is often called content-based image retrieval (CBIR). As described above, web authors tend to include semantically related text and images on web pages. To find information about a well-known landmark, web pages with images that match the image of the current location can be found and the surrounding text can be analyzed. Using an image taken with a camera phone, i.e. handheld device 10, similar images can be found on the web. Relevant keywords can be found in the surrounding text and used directly as a location context cue, or used for further interactive browsing to find relevant information resources.

It has been observed for a pure CBIR system to search the millions of images on the web in real-time is unpractical. However, using a hybrid keyword and image query system, it is possible to effectively implement CBIR over 425 millions images without having to apply a content-based metric on every single image by taking advantage of the existing keyword-based image search engine, Google, which has indexed more than 425 millions images. By extracting keywords from web pages found in a content-based search in the database 25, and using these keywords on Google to search its larger database of images for images, it is possible to search a large number of images in a smaller amount of time. Such a hybrid design benefits from both the power of keyword based search algorithms, i.e. speed and comprehensiveness, and image based search algorithms, i.e. visual relevancy.

Appreciating that one of the shortcomings of keyword-based search algorithms is the existence of visually unrelated images in the result set, by apply a filtering step, the number of unrelated images can be reduced by using a content-based image retrieval (CBIR) algorithm on this small set of resulting images to identify visually related images. The latter provides a method to retrieve images that are not only visually relevant but also textually related. Having the right feature set and image representation is very crucial for building a successful CBIR system. The performance of general object matching in CBIR systems is typically poor. Image segmentation and viewpoint variation are significant problems. Fortunately, finding images of landmarks requires analysis over the entire image, making general image segmentation unnecessary. A simpler, robust filtering step can remove small regions with foreground objects. This is easier than segmenting a small or medium sized object from a large image. Also, users ask about a location most likely because they are physically there and there are a much smaller number of physically common viewpoints of prominent landmarks than in the entire view sphere of a common object.

Although any image matching algorithm can be used, two common image matching metrics on the task of matching mobile location images to images on the World Wide Web were implemented. The first metric is based on the energy spectrum, the squared magnitude of the windowed Fourier transform of an image. It contains unlocalized information about the image structure. This type of representation has been demonstrated to be invariant to object arrangement and object identities. The energy spectrum of a scene image stays fairly constant despite the presence of minor changes in local configuration. For instance, different placements of people in front of a building should not affect its the image representation too dramatically. The second image matching metric is based on wavelet decompositions. Local texture features are represented as wavelets computed by filtering each image with steerable pyramids with 6 orientations and 2 scales to its intensity (grayscale) image. Since this provides only the local representation of the image, the mean values of the magnitude of the local features averaged over large windows are taken to capture the global image properties. Given a query mobile image of some landmark, similar images can be retrieved by finding the k nearest neighbors in the database using either of the two metrics, where k=16. However, the high dimensionality (d) of the feature involved in the metric can be problematic. To reduce the dimensionality, principal components (PCs) is computed over a large number of landmark images on the web. Then, each feature vector can be projected onto the first n principal components. Typically, n<<d. The final feature vector will be the n coefficients of the principal components. In an alternative embodiment, image matching using the "SIFT" local feature method was used. It should be appreciated that there are many other possible features and any one of the various techniques could be used.

After finding similar landmark images, the next step is to extract relevant keywords from their source web pages that can give hints of the identity of the location. A set of keywords can be discovered in this way and ranked by computing the term frequency inverse document frequency. The idea is to favor those keywords that are locally frequent by globally infrequent.

Figure 6:
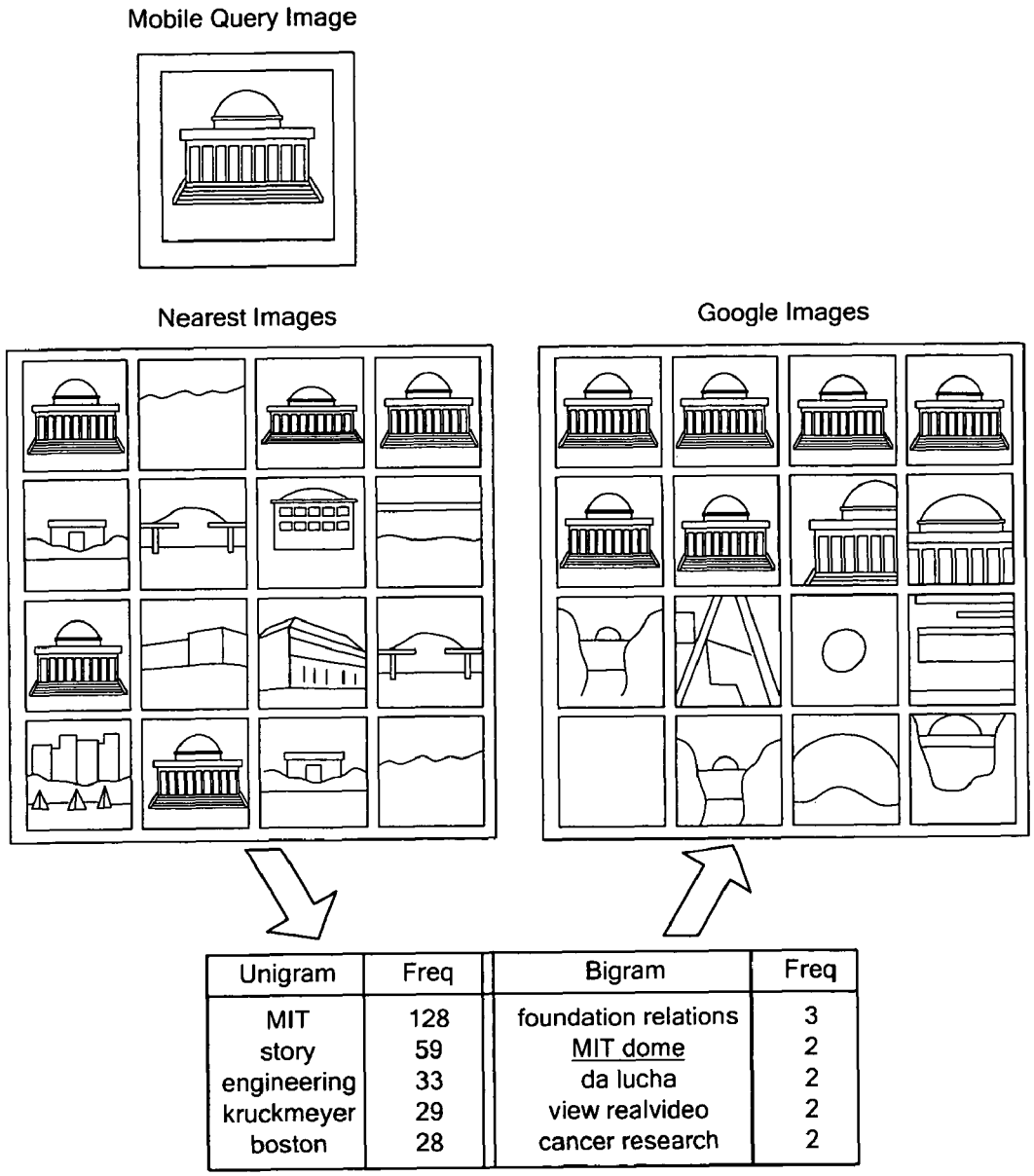
FIGS. 6, 6A and 6B are exemplary screen displays used in the searching processes according to the invention.

Having uncovered a set of keywords, certain keywords can be used to search Google either for more web pages or images as shown in FIG. 6. Searching for additional web pages provides other web pages that might share conceptual similarity with the query image but do not contain any similar image. These web pages would not have been found if only an image-based search was employed. Referring to FIG. 6, a query image is used to search the database 25 wherein the sixteen nearest images of the query image are retrieved from the bootstrap database 25. In this example, five of the results are correct (1, 3, 4, 9, and 14). The table shows the keywords extracted from the five source web pages associated with the resulting correct images. The bigram keyword "MIT dome" is sent to Google to retrieve 16 textually-related images. In this example, ten of the textually-related images (1, 2, 3, 4, 5, 6, 7, 8, 9, and 16) are also visually similar.

Figure 6A:
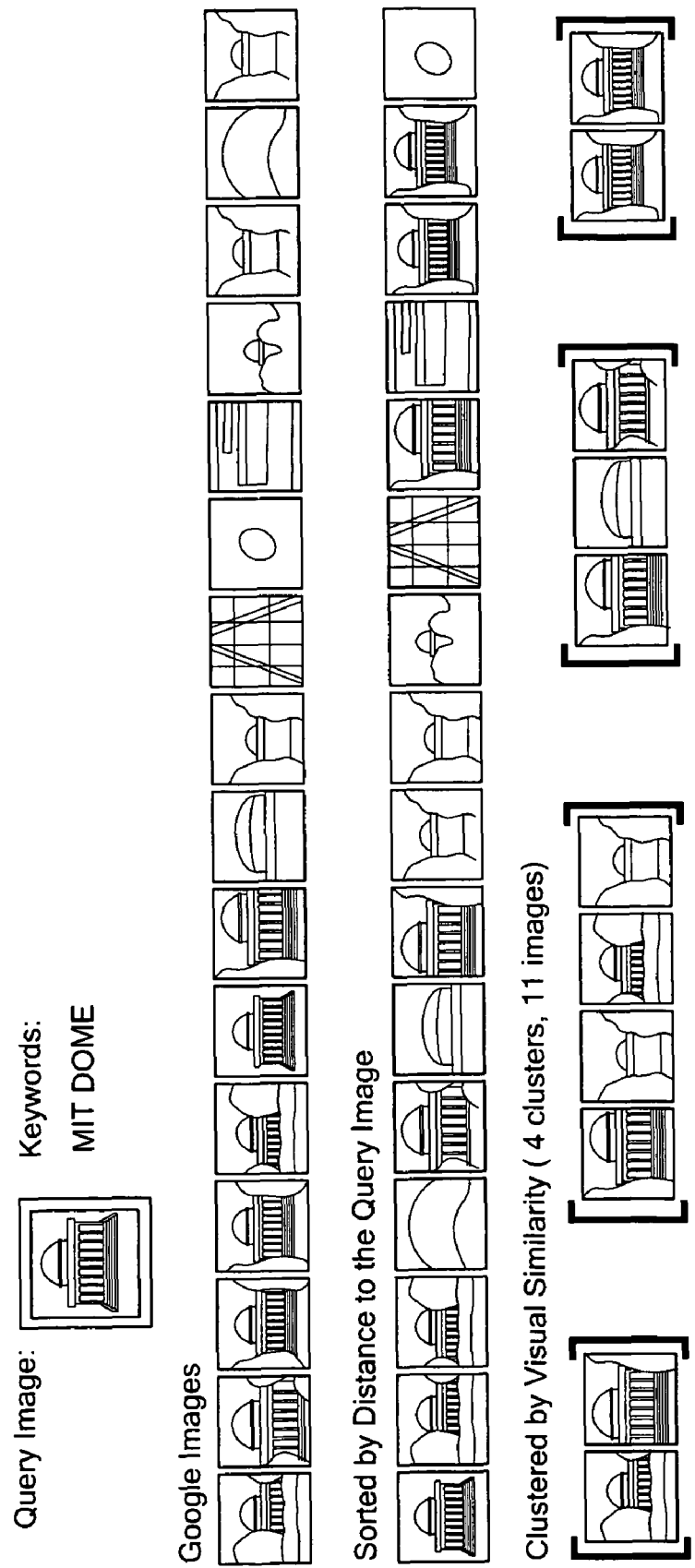
Figure 6B:
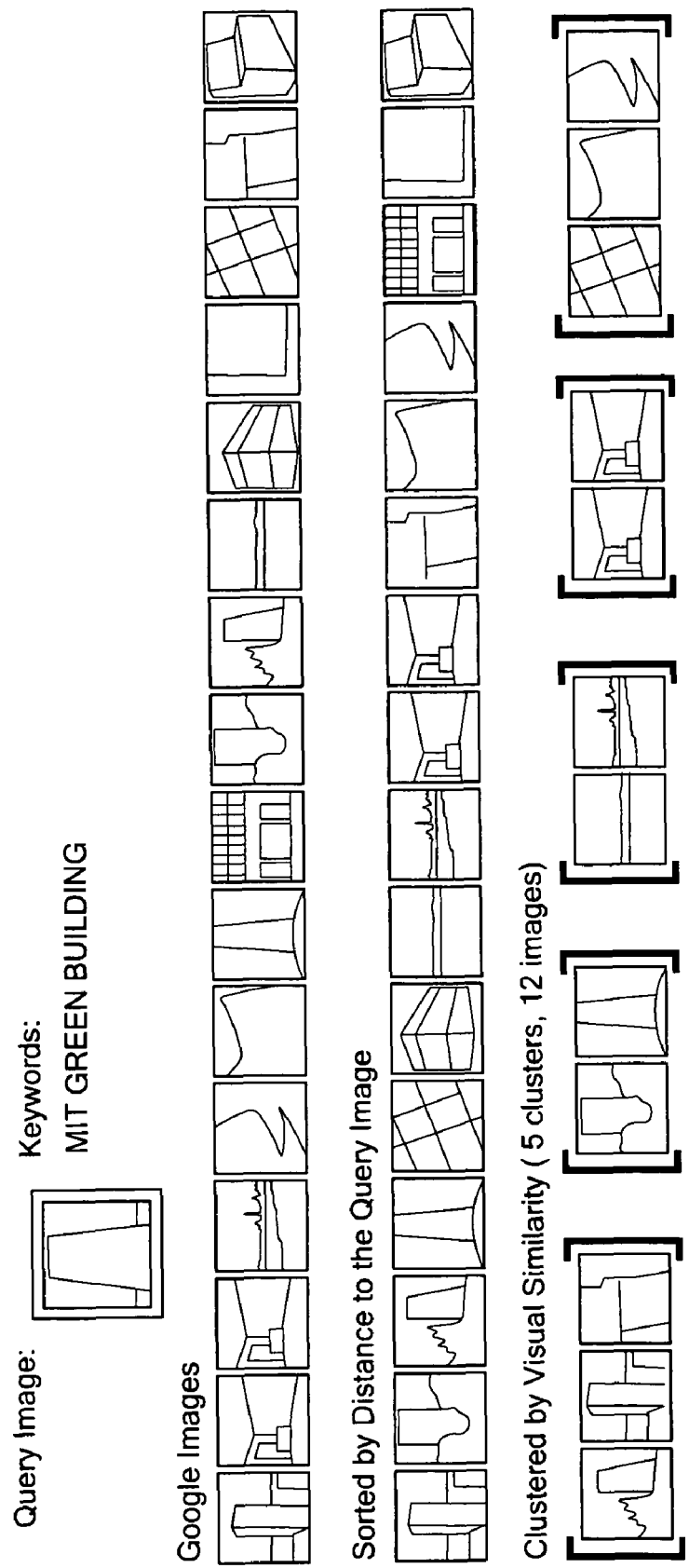

Searching for more images might return many visually unrelated images. Therefore, a CBIR filter step is applied to the result and only those images visually close to the query image are kept under the same matching metric. Moreover, there might exist images visually distant but conceptually close to the query image. They can be useful to know more about this location. A bottom-up, opportunistic clustering technique is accomplished that iteratively merges data points to uncover visually coherent groups of images. If a group is reasonably large, it means the images in this group represent some potentially significant common concept. By filtering the search result, as shown in FIGS. 6A and 6B, an improved result is obtained. Two examples are shown in FIGS. 6A and 6B, respectively. The keywords are selected by the user from the k best keywords suggested by an automatic keyword extraction algorithm. The selected keywords are submitted to Google to retrieve a set of images that are textually relevant but not quite visually similar. The distance metric between the query image and each Google image is computed. The result is sorted by distance in increasing order. Alternatively, visually similar images in the Google set can be clustered. Some of the images are left out of any cluster because they are too distinct.

To find similar landmark images, it would not be useful to search images that do not contain any landmarks, e.g. faces, animals, or logos. Thus, an image classifier is used to classify the images in the database as landmark or non-landmark. The non-landmark images were then removed from the database to reduce the search-space to approximately 2000 images. The image classifier was trained using a method similar to a method for classifying indoor-outdoor images by examining color and texture characteristics. Between the two matching metrics, the wavelet-based metric was consistently better over different values of k. The reason might be that such wavelets embed edge-orientation information better describes the structural outline of typical man-made buildings. Lastly, in FIGS. 6A and 6B, anecdotal examples are shown of using nearest neighbor or bottom-up clustering to filter the Google image search result. In both cases, the filtering step was able to rearrange the search result in such a way that the visually related images were better identified and presented.

Figure 5C:
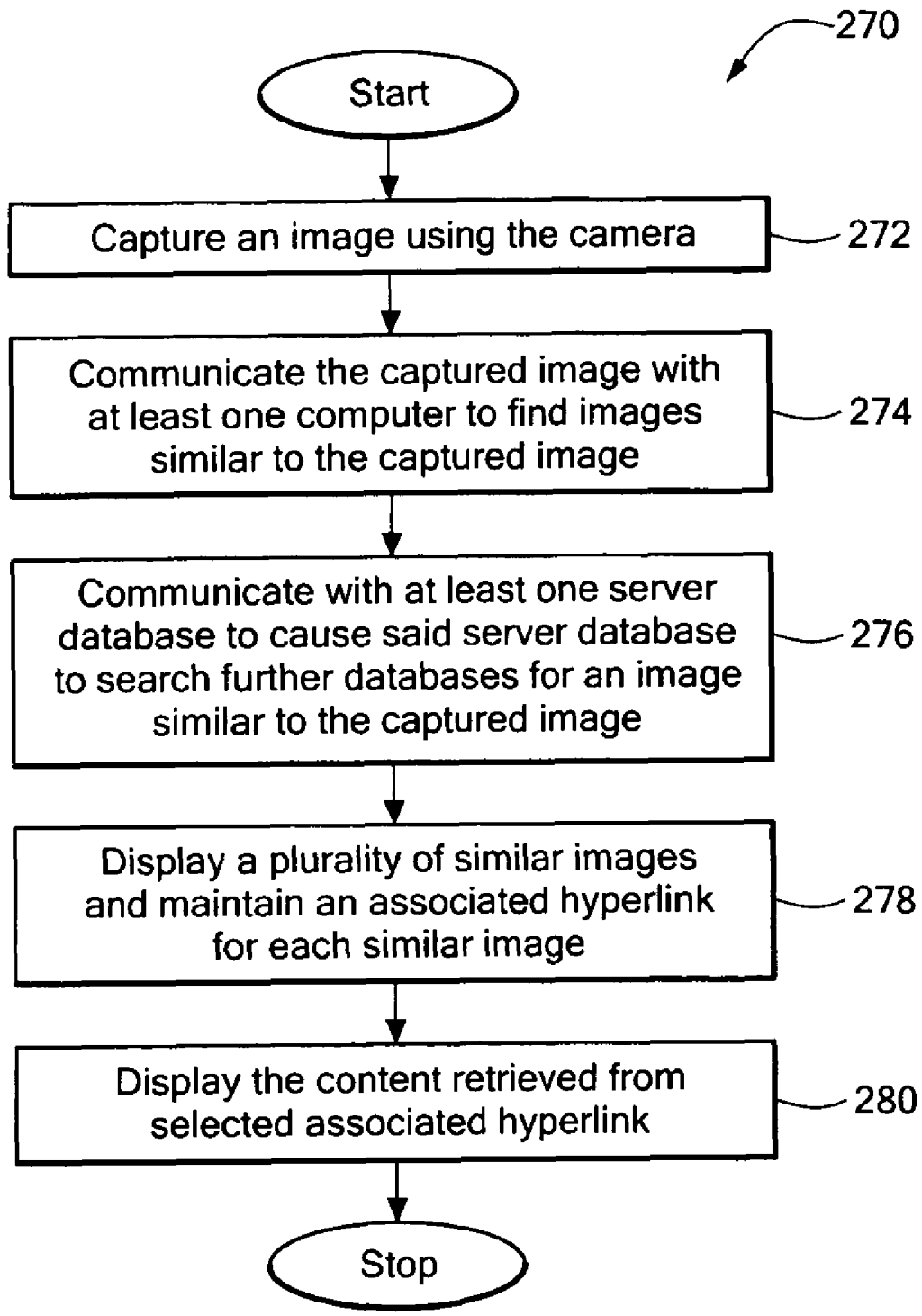

Referring now to FIG. 5C, a flow diagram 270 showing the steps the processor 30 and the web server 24 would perform for alternative embodiment are shown. As shown in process step 272, a user causes the handheld device 10 (mobile deixis device 10) to capture an image as shown in window 210 (FIG. 2) to send as a query. As shown in process step 274, connected the network 20, the handheld device 10 communicates the captured image to a web server which could be web server 24 (FIG. 1A) to find images similar to the captured image. It should be appreciated that web server 24 in this implementation includes a pre-programmed database including images of interest and corresponding data. The captured image is used as a query to find similar images from the small image database using content-based image retrieval (CBIR) techniques. As shown in process step 24, if the results from the query are not satisfactory, the handheld device 10 can communicate with the server 24 to cause the server 24 to search further computers, i.e. computers 24a, 24b, for images similar to the captured image. As shown in process step 278, the results from the further query is provided with each image having an associated keyword that helps describe the image and an associated URL. As shown in process step 280, a user can then select one of the images and the content from the associated URL is then displayed. With this technique, if the web server 24 is missing the necessary images to provide a bootstrap database to complete the initial query, the query initiated by the hand held device 10 can cause the computer 24 to build additional data sets for various images of interest.

It should be appreciated that the various techniques taught can be applied in various implementations. For example, the process step 276 associated with FIG. 5C could be added to the process associated with FIG. 5B such that if process step 256 did not produce a satisfactory result, process step 276 in FIG. 5C could be implemented after process step 256. Furthermore, certain processing steps could be implemented on computer 24 that is communicating with handheld device 10, or alternatively that process step could be implemented on handheld device 10 depending upon convenience or network latency.

It should be appreciated that FIGS. 4A, 5A, 5B and 5C show flowcharts corresponding to the above contemplated techniques which would be implemented in the mobile deixis device 10 (FIG. 1). The rectangular elements (typified by element 252 in FIG. 5B), herein denoted "processing blocks," represent computer software instructions or groups of instructions. The diamond shaped elements (typified by element 258 in FIG. 5B), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

It should now be appreciated that a method for identifying a location comprises the steps of: (i) providing a database of images, each image having an associated URL that includes said image and a description of the image; (ii) comparing an image of an unknown location with images from the database of images and providing a list of possible matching images; and (iii) reviewing the images in the list of possible matching images until the correct location is identified. In one embodiment, the comparing step includes comparing at least one of energy spectrum data, color histogram data, primitive filter data, and local invariant data. In another embodiment, the comparing step comprises at least one of the techniques including a least square matching technique, a normalizing the image technique, an eigen value technique, a matching histogram of image feature technique and an image matching engine with transformation technique.

It should now be appreciated, it is possible to conduct fast and comprehensive CBIR searches over hundreds of millions of images using a text-based search engine from keywords generated from an initial image search. It is possible to recognize location from mobile devices using image-based web search, and that common image search metrics can match images captured with a camera-equipped mobile device to images found on the world-wide-web or other general-purpose database. A hybrid image-and-keyword searching technique was developed that first performed an image-based search over images and links to their source web pages in a bootstrap database that indexes only a small fraction of the web. A procedure to extract relevant keywords from these web pages was developed; these keywords can be submitted to an existing text-based search engine (e.g. Google) that indexes a much larger portion of the web. The resulting image set is then filtered to retain images close to the original query. With such an approach it is thus possible to efficiently search hundreds of millions of images that are not only textually related but also visually relevant.

All publications and references cited herein are expressly incorporated herein by reference in their entirety.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A system to provide location awareness services comprising:
   (a) a computer network including a wireless network and a wired network;
   (b) a server having a database of previously saved images and capable of searching images by comparing an image with the saved images in the database using a content based image retrieval technique;
   (c) a handheld device comprising:
      (i) a camera to capture an image of a location;
      (ii) a mobile communication device, coupled to the camera and to the wireless network, to communicate the captured image to the server having the database of previously saved images to find similar images in the database similar with the captured image using the content based image retrieval technique; and
      (iii) a user interface, coupled to the mobile communication device, to communicate to an user any resulting images and associated hyperlinks of found similar images; and
   (d) a plurality of computers, each computer have a plurality of computer files in a format to display as a web page, each file including an image and associated text, each computer connected to the computer network, at least one of the computer files having an associated hyperlink, an image similar to the captured image and text describing an object in the image;
   wherein the server having the database of saved images searches for additional images using a content based image retrieval technique on one of the plurality of computers when an image similar to the captured image is not found in the database on the server.

2. The system to provide location awareness services as recited in claim 1 wherein the server further comprises means to compare images with no manual input of features from a user.

3. The system to provide location awareness services as recited in claim 1 wherein the user interface comprises a computer connection.

4. The system to provide location awareness services as recited in claim 1 wherein the associated text describes features of an object in the image including geographical location of the object.

5. The system to provide location awareness services as recited in claim 1 wherein the associated text describes features of the object in the image including a description and historical facts regarding the object.

6. The system to provide location awareness services as recited in claim 1 wherein the associated text includes a uniform resource locator (URL).

7. The system to provide location awareness services as recited in claim 1 wherein at least one of the computers includes a plurality of computer files having images of objects of interest located within a predetermined radius about a geographical location.

8. The system to provide location awareness services as recited in claim 7 wherein the computer having a plurality of computer files having images of objects of interest located within a predetermined radius about a geographical location was previously trained to find common objects known to be of interest.

9. The system to provide location awareness services as recited in claim 7 further comprising:
   a global positioning system (GPS) receiver to identify the geographical location of the mobile communication device to help eliminate non-useful images.

10. The system to provide location awareness services as recited in claim 1 wherein at least one of the computers includes at least one computer file having an image of an object of known interest and an associated image of an object of less recognized interest within a predetermined radius about a geographical location of the known interest object to aid a user in finding the object of less recognized interest.

11. The system to provide location awareness services as recited in claim 1 wherein at least one of the computers includes at least one computer file having an image of an object of known interest and an associated image of an object of less recognized interest within the field of view of the known interest object to aid a user in finding the object of less recognized interest.

12. The system to provide location awareness services as recited in claim 1 wherein the server includes a capability to search other computers using keywords extracted from a joint set of keywords from a web page associated with one of the similar images, at least one of the other computers having at least one computer file having text matching the keywords.

13. The system to provide location awareness services as recited in claim 12 wherein at least one image from a computer file having text matching the keywords is used to search for additional similar images using a content based image retrieval technique.

14. The system to provide location awareness services as recited in claim 12 wherein at least one computer file having text matching the associated text describing the object in the image is communicated to the computer that initiated the search.

15. The system to provide location awareness services as recited in claim 14 wherein the computer that initiated the search is capable of comparing using content based retrieval techniques the original image with images returned in the computer file having text matching the associated text describing the object in the image.

16. The system to provide location awareness services as recited in claim 12 wherein at least one of the computers includes at least one computer file having an image of an object of known interest and an associated image of an object of less recognized interest within the field of view of the known interest object to aid a user in finding the object of less recognized interest all located within a predetermined radius about a geographical location.

17. A storage medium comprising:
   a first computer readable program code stored on the storage medium being operative to interact with a processor in a server and to communicate with a handheld device to capture an image from a camera;
   a second computer readable program code stored on the storage medium being operative to interact with the processor in the server having a database with image files, each file including an image, text and an associated link and to search said database of image files for a similar image similar to the captured image by comparing using a content based image retrieval technique the captured image with other images and to cause said server to provide to the handheld device an image and a hyperlink to the image file in the database having the similar image; and
   a third computer readable program code stored on the storage medium being operative to interact with the processor in the server to communicate with other computers having image files and to search using a content based image retrieval technique said other computers for a similar image when a similar image is not found in the database in the server and to add the similar image and an associated hyperlink when found on another computer to the database.

18. A method for identifying a location comprising the steps of:
   (i) providing a database of images on a first computer, each image having an associated URL that includes said image and a description of the image;
   (ii) comparing using a content based image retrieval technique an image of an unknown location communicated to the first computer from a handheld device with images from the database of images and providing a list of images and corresponding URL of possible matching images to the handheld device;
   (iii) searching using a content based image retrieval technique, using the first computer, files on additional computers when a matching image is not found in the database on the first computer and adding the similar image and associated hyperlink when found on another computer to the database; and
   (iv) reviewing the images in the list of possible matching images until the matching image of the correct location is identified.

19. The method for identifying a location as recited in claim 18 wherein the comparing step includes comparing local spatial invariant feature data.

20. The method for identifying a location as recited in claim 18 wherein the comparing step comprises the techniques including a matching histogram of image feature technique.

* * * * *